INVENTORS
HIROMU OUCHI
MASAMITSU NISHIDA

INVENTORS
HIROMU OUCHI
MASAMITSU NISHIDA

United States Patent Office 3,425,944

Patented Feb. 4, 1969

3,425,944

PIEZOELECTRIC CERAMIC COMPOSITIONS

Hiromu Ouchi, Toyonaka-shi, Osaka-fu, and Masamitsu Nishida, Osaka-shi, Osaka-fu, Japan, assignors to Matsushita Electric Industrial Co., Ltd., Osaka, Japan Filed Dec. 14, 1965, Ser. No. 513,798

U.S. Cl. 252—62.9 6 Claims

Int. Cl. C04b 35/28, 35/36

ABSTRACT OF THE DISCLOSURE

Piezoelectric ceramic compositions of the ternary system $Pb(Mg_{1/3}Nb_{2/3})O_3$-$PbTiO_3$-$PbZrO_3$ modified with combined $MnO_2$ and NiO additives for enhanced mechanical quality factor and coupling coefficient. These compositions have utility in various transducer applications.

This invention relates to piezoelectric ceramic compositions and articles of manufacture fabricated therefrom. More particularly, the invention pertains to novel ferroelectric ceramics which are polycrystalline aggregates of certain constituent. These piezoelectric compositions are sintered to ceramics by ordinary ceramic techniques and thereafter ceramics are polarized by applying a D-C voltage between the electrodes to impart thereto electromechanical transducing properties similar to the well known piezoelectric effect. The invention also encompasses the calcined product of raw ingredients and the articles of manufacture such as electromechanical transducers fabricated from the sintered ceramic.

The ceramic bodies materialized by the present invention exist basically in the following solid solution comprising the ternary system $Pb(Mg_{1/3}Nb_{2/3})O_3$-$PbTiO_3$-$PbZrO_3$ modified with combined $MnO_2$ and NiO additives. A polycrystalline material composed of $Pb(Mg_{1/3}Nb_{2/3})O_3$-$PbTiO_3$-$PbZrO_3$ will be referred to as PCM.

The use of piezoelectric materials in various transducer applications in the production, measurement and sensing of sound, shock, vibration, pressure, etc., have increased greatly in recent years. Both crystal and ceramic types of transducers have been widely used. But, because of their potentially lower cost and facility in the fabrication of ceramics with various shapes and sizes and their greater durability for high temperature and/or for humidity than that of crystalline substances such as Rochelle salt, piezoelectric ceramics materials have recently come to importance in various transducer applications.

The piezoelectric characteristics of ceramics required apparently vary with species of applications. For example, electromechanical transducers such as phonograph pickup and microphone require piezoelectric ceramics characterized a substantially high electromechanical coupling coefficient and dielectric constant. On the other hand, it is desired to filter applications of piezoelectric ceramics that the material exhibit a higher value of mechanical quality factor and high electromechanical coupling coefficient. Furthermore, ceramic materials require a high stability with temperature and time in resonant frequency and in other electrical properties.

As more promising ceramics for these requirements, lead titanate-lead zirconate is in wide use up to now. However, it is difficult to get a very high mechanical quality factor combined with high planar coupling coefficient in the lead titanate-lead zirconate ceramics.

It is, therefore, the fundamental object of the present invention to provide a novel and improved piezoelectric ceramic materials which overcomes at least one of the problems outlined above.

A more specific object of the invention is to provide improved polycrystalline ceramics characterized by very high mechanical quality factor combined with high piezoelectric coupling coefficient.

Another object of the invention is the provision of novel piezoelectric ceramic compositions, certain properties of which can be adjusted to suit various applications.

A further object of the invention is the provision of improved electromechanical transducer utilizing, as the active elements, an electrostatically polarized body of the novel ceramic compositions.

These objects of the invention and the manner of their attainment will be readily apparent from a reading of the following description and from the accompanying drawing, in which.

Figures 1, 2:
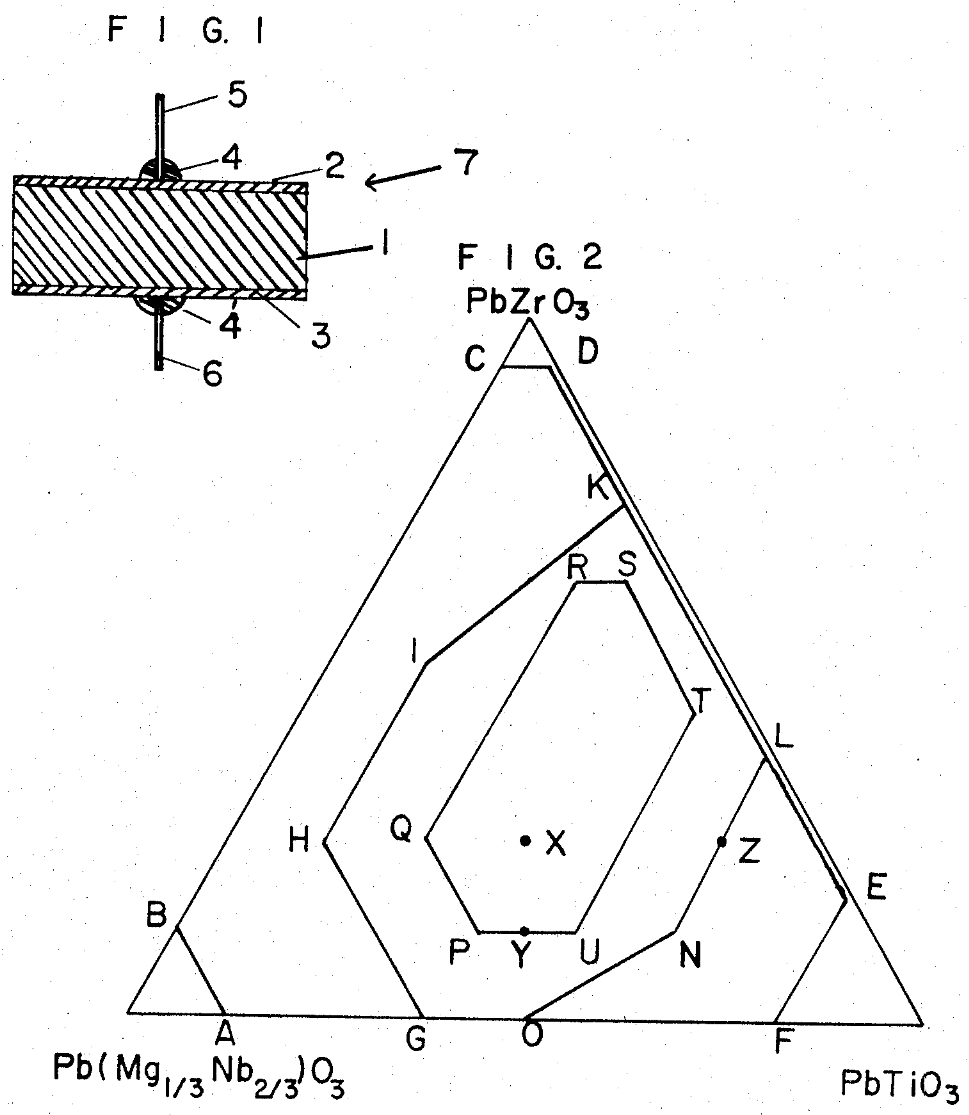
FIG. 1 is a cross-sectional view of an electromechanical transducer embodying the present invention.
FIG. 2 is a triangular, compositional diagram of materials utilized in the present invention.

Before proceeding with a detailed description of the piezoelectric materials contemplated by the invention, their application in electromechanical transducers will be described with reference to FIGURE 1 of the drawings wherein reference character 7 designates, as a whole, an electromechanical transducers having, as its active element, a preferably disc shaped body 1 of piezoelectric ceramic materials according to the present invention.

Body 1 is electrostatically polarized, in a manner hereinafter set forth, and is provided with a pair of electrodes 2 and 3, applied in a suitable manner, on two opposed surfaces thereof. Wire leads 5 and 6 are attached conductively to the electrodes 2 and 3 respectively by means of solder 4. When the ceramic is subjected to shock, vibration or other mechanical stress, an electrical output generated can be taken from wire leads 5 and 6. Conversely, as with other piezoelectric transducers, application of electrical voltage to electrodes 5 and 6 will result in mechanical deformation of the ceramic body. It is to be understood that the term electromechanical transducer as used herein is taken in its broadest sense and includes piezoelectric filter, frequency control devices, and the like, and that the invention may also be used and adapted to various other applications requiring materials having dielectric, piezoelectric and/or electrostructive properties. In the copending U.S. patent application Ser. No. 450,738 filed Apr. 26, 1965, now Patent No. 3,268,453, the present inventors have disclosed that ternary solid solution of $Pb(Mg_{1/3}Nb_{2/3})O_3$-$PbTiO_3$-$PbZrO_3$ exists in perovskite type structure and exhibits excellent piezoelectric properties at a vicinity of morphotropic compositions. These ternary compositions and their piezeoelectric and dielectric properties are also listed in our paper, Journal of the American Ceramic Society, December 1965, vol. 48, No. 12, pp. 630–635.

All possible compositions coming within the ternary system $Pb(Mg_{1/3}Nb_{2/3})O_3$-$PbTio_3$-$PbZro_3$ are represented by the triangular diagram constituting FIG. 2 of the drawings. Some compositions represented by the diagram, however, does not exhibit high piezoelectricity, and many are electromechanically active only to a slight degree. The present invention is concerned only with those compositions exhibiting piezoelectric response of appreciable magnitude. As a matter of convenience, the planar coupling coefficient ($K_p$) of test discs will be taken as a measure of piezoelectric activity. Thus, within the area bounded by lines connecting points ABCDEF, FIG. 2, all compositions polarized and tested show a planar coupling coefficient of approximately 5% or higher. The compositions in the area of the diagram bounded by lines connecting points GHIKLNO of FIG. 2, exhibit a planar coupling coefficient of approximately 20% or higher. Particularly the compositions within the polygonal region PQRSTU which includes compositions of 50.0–6.25 mole percent of $Pb(Mg_{1/3}Nb_{2/3}O_3$, 50.0–25.0 mole percent of $PbTiO_3$ and 62.5–12.5 mole percent of $PbZrO_3$ exhibit a planar coupling coefficient of approximately 30% or higher. The molar percent of the three components of compositions ABCDEFGHIKLNOPQRSTU are as follows:

| | $Pb(Mg_{1/3}Nb_{2/3})O_3$ | $PbTiO_3$ | $PbZrO_3$ |
|---|---|---|---|
| A | 87.5 | 12.5 | 0.0 |
| B | 87.5 | 0.0 | 12.5 |
| C | 5.0 | 0.0 | 95.0 |
| D | 1.0 | 4.0 | 95.0 |
| E | 1.0 | 81.3 | 17.7 |
| F | 18.7 | 81.3 | 0.0 |
| G | 62.5 | 37.5 | 0.0 |
| H | 62.5 | 12.5 | 25.0 |
| I | 50.0 | 12.5 | 37.5 |
| K | 1.0 | 24.0 | 75.0 |
| L | 1.0 | 61.5 | 37.5 |
| N | 25.0 | 62.5 | 12.5 |
| O | 50.0 | 50.0 | 0.0 |
| P | 50.0 | 37.5 | 12.5 |
| Q | 50.0 | 25.0 | 25.0 |
| R | 12.5 | 25.0 | 62.5 |
| S | 6.25 | 31.25 | 62.5 |
| T | 6.25 | 50.0 | 43.75 |
| U | 37.5 | 50.0 | 12.5 |

Furthermore, the compositions near the morphotropic phase boundary, particularly $Pb(Mg_{1/3}Nb_{2/3})_{0.375}Ti_{0.375}Zr_{0.25}O_3$ and $Pb(Mg_{1/3}Nb_{2/3})_{0.250}Ti_{0.375}Zr_{0.375}O_3$ give ceramic products having a planar coupling coefficient of 45% or higher.

According to the present invention it has been discovered that an addition of combined additives of nickel oxide and manganese oxide improves the $Q_M$ and $K_p$ of the ternary solid solution defined by the polygonal area ABCDEF in FIG. 2 more extensively than a single addition of nickel oxide or manganese oxide. Operable additive combination comprises 0.1 to 5 weight percent of nickel oxide (NiO) and 0.1 to 5 weight percent of manganese oxide ($MnO_2$).

It is necessary for obtaining high $Q_M$ and high $K_p$ that said additive combination has 0.2 to 10 of a weight ratio of nickel oxide to manganese oxide. Operable weight percent of said combination is not more than 6%. An addition of said combination more than 7 weight percent reduces slightly the $K_p$ and clearly the $Q_M$ of the ternary solid solution. A preferable improvement in the $K_p$ and $Q_M$ of ternary solid solution defined by and included within the polygonal area PQRSTU in FIGURE 2 can be obtained by employing 0.5 to 1 weight percent of additive combination having 0.5 to 2.0 of the weight ratio of NiO to $MnO_2$. Desirable effects of more specified additions will be readily understood by the specified examples indicated in the following table.

The composition described herein may be prepared in accordance with various well known ceramic procedures. A preferred method, however, hereinafter more fully described, consists in the use of PbO or $Pb_3O_4$, MgO or $MgCO_3$, $Nb_2O_5$, $TiO_2$, $MnO_2$ and NiO.

The starting materials, viz., lead oxide (PbO), magnesia (MgO), niobia ($Nb_2O_5$), titania ($TiO_2$), zirconia ($ZrO_2$), $MnO_2$ and NiO, all of relatively pure grade (e.g., C.P. grade) are intimately mixed in a rubber-lined ball mill with distilled water. In milling the mixture care should be exercised to avoid, or the proportions of ingredients varied to compensate for, contamination by wear of the milling ball or stones.

Following the wet milling, the moisture is dried and mixed to assure as homogeneous a mixture as possible. Thereafter, the mixture, suitably formed into desired forms at a pressure of 400 kg./cm.². The compacts are pre-reacted by calcination at a temperature of around 850° C. for 2 hours.

After calcination, the reacted material is allowed to cool and is then wet milled to a small particle size. Once again, care should be exercised to avoid, or the proportions of ingredients varied to compensate for, contamination by wear of the milling balls or stones. Depending on preference and the shapes desired the material my be formed into mix or slip suitable for pressing, slip casting, or extruding, as the case may be, in accordance with conventional ceramic procedures. The sample for which data are given hereinbelow were prepared by mixing 100 grams of the milled pre-sintered mixture with 5 cc. of distilled water. The mix was then pressed into discs of 20 mm. diameter and 2 mm. thickness at a pressure of 700 kg./cm.². The pressed discs are fired at a temperature set in table for 45 minutes of heating period. According to the present invention, there is no need to fire the composition in an atmosphere of PbO and no special care is required for the temperature gradient in a furnace compared with the prior art. Thus, according to the present invention, uniform and excellent piezoelectric ceramic products can be easily obtained simply by covering the samples with an alumina crucible.

The sintered ceramics are polished on both surfases to the thickness of one millimeter. The polished disc surfaces may then be coated with silver paint and fired to form silver electrodes. Finally, the discs are polarized while immersed in a bath of silicone oil at 100° C. A voltage gradient of D-C kv. per mm. is maintained for one hour, and the discs are field-cooled to room temperature in thirty minutes.

The piezoelectric and dielectric properties of the polarized specimen have been measured at 20° C. in a relative humidity of 50% and at a frequency of 1 kc. A measurement of piezoelectric properties was made by the IRE standard circuit and the planar coupling coefficient was determined by the resonant to antiresonant frequency method. Examples of specific ceramic compositions according to this invention and various pertinent electromechanical and dielectric properties thereof are given in table and some of their value are plotted in FIGURES 3 and 4 to show the variation with additives. Compositions without additives and with only one additive are also given in table and FIGURES 3–4 for purpose of comparison. From table it will be readily evident that all exemplary composition modified with an addition of both 0.1 to 5 weight percent of nickel oxide and 0.1 to 5 weight percent of manganese oxide are characterized by very high mechanical quality factor, high planar coupling, relatively high dielectric constant and low dissipation factor, all of

TABLE

| Example No. | Intended composition: Base composition | Additives, in weight percent: $MnO_2$ | NiO | Firing temp., ° C. | 24 hours after poling: Mechanical quality factor, $Q_M$ | Planar coupling coeff. $K_p$, in percent | Dielectric constant at 1 kc. P.S. | Dissipation D, in percent at 1 kc. P.S. |
|---|---|---|---|---|---|---|---|---|
| 1 | $Pb(Mg_{1/3}Nb_{2/3})_{0.375}Ti_{0.375}Zr_{0.25}O_3$ | None | None | 1,280 | 89 | 50.2 | 1,589 | 1.75 |
| 2 | $Pb(Mg_{1/3}Nb_{2/3})_{0.375}Ti_{0.375}Zr_{0.25}O_3$ | | 1.0 | 1,240 | 95 | 62.0 | 1,930 | 1.05 |
| 3 | $Pb(Mg_{1/3}Nb_{2/3})_{0.375}Ti_{0.375}Zr_{0.25}O_3$ | 0.1 | | 1,260 | 265 | 52.0 | 1,512 | 0.82 |
| 4 | $Pb(Mg_{1/3}Nb_{2/3})_{0.375}Ti_{0.375}Zr_{0.25}O_3$ | 0.1 | 1.0 | 1,260 | 378 | 59.5 | 1,704 | 0.76 |
| 5 | $Pb(Mg_{1/3}Nb_{2/3})_{0.375}Ti_{0.375}Zr_{0.25}O_3$ | 0.2 | | 1,260 | 626 | 54.0 | 1,435 | 0.34 |
| 6 | $Pb(Mg_{1/3}Nb_{2/3})_{0.375}Ti_{0.375}Zr_{0.25}O_3$ | 0.2 | 1.0 | 1,240 | 752 | 58.6 | 1,526 | 0.20 |
| 7 | $Pb(Mg_{1/3}Nb_{2/3})_{0.375}Ti_{0.375}Zr_{0.25}O_3$ | 0.5 | | 1,260 | 1,644 | 52.7 | 1,131 | 0.45 |
| 8 | $Pb(Mg_{1/3}Nb_{2/3})_{0.375}Ti_{0.375}Zr_{0.25}O_3$ | 0.5 | 1.0 | 1,240 | 1,842 | 55.1 | 1,103 | 0.40 |
| 9 | $Pb(Mg_{1/3}Nb_{2/3})_{0.375}Ti_{0.375}Zr_{0.25}O_3$ | 1.0 | | 1,260 | 1,530 | 48.3 | 907 | 0.89 |

TABLE—Continued

Figure 3:
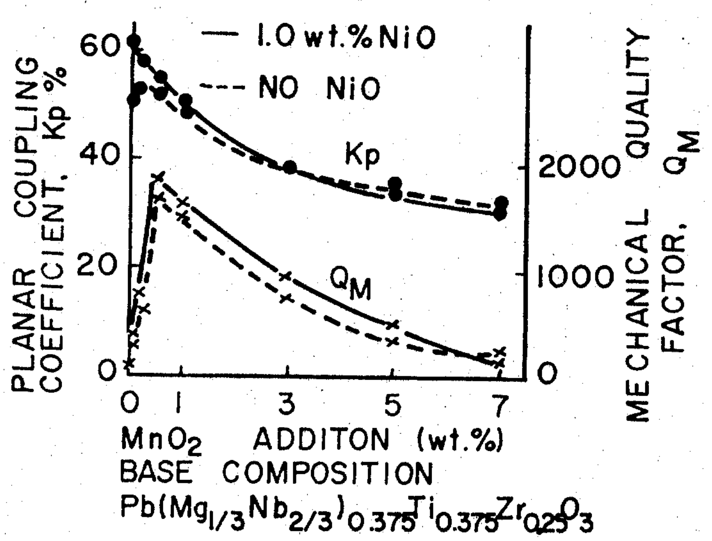
FIGS. 3 and 4 are a graph showing the effects of amounts of additives on mechanical quality factor ($Q_M$), and planar coupling coefficient ($K_p$) of exemplary compositions accordng to the present invention at 20° C. and 1 kc.

| Example No. | Intended composition | | | Firing temp., ° C. | 24 hours after poling | | | |
|---|---|---|---|---|---|---|---|---|
| | Base composition | Additives, in weight percent | | | Mechanical quality factor, $Q_M$ | Planar coupling coeff. $K_p$, in percent | Dielectric constant at 1 kc. P.S. | Dissipation D, in percent at 1 kc. P.S. |
| | | $MnO_2$ | NiO | | | | | |
| 10 | $Pb(Mg_{1/3}Nb_{2/3})_{0.375}Ti_{0.375}Zr_{0.25}O_3$ | 1.0 | 1.0 | 1,240 | 1,548 | 51.1 | 877 | 0.88 |
| 11 | $Pb(Mg_{1/3}Nb_{2/3})_{0.375}Ti_{0.375}Zr_{0.25}O_3$ | 3.0 | | 1,240 | 753 | 39.2 | 695 | 3.38 |
| 12 | $Pb(Mg_{1/3}Nb_{2/3})_{0.375}Ti_{0.375}Zr_{0.25}O_3$ | 3.0 | 1.0 | 1,240 | 938 | 38.8 | 643 | 3.35 |
| 13 | $Pb(Mg_{1/3}Nb_{2/3})_{0.375}Ti_{0.375}Zr_{0.25}O_3$ | 5.0 | | 1,220 | 386 | 36.0 | 704 | 7.18 |
| 14 | $Pb(Mg_{1/3}Nb_{2/3})_{0.375}Ti_{0.375}Zr_{0.25}O_3$ | 5.0 | 1.0 | 1,240 | 505 | 34.4 | 633 | 9.20 |
| 15 | $Pb(Mg_{1/3}Nb_{2/3})_{0.375}Ti_{0.375}Zr_{0.25}O_3$ | 7.0 | | 1,200 | 261 | 32.6 | 700 | 11.95 |
| 16 | $Pb(Mg_{1/3}Nb_{2/3})_{0.375}Ti_{0.375}Zr_{0.25}O_3$ | 7.0 | 1.0 | 1,220 | 186 | 31.4 | 911 | 15.78 |
| 17 | $Pb(Mg_{1/3}Nb_{2/3})_{0.375}Ti_{0.375}Zr_{0.25}O_2$ | | 0.1 | 1,260 | 81 | 54.5 | 1,712 | 1.88 |
| 18 | $Pb(Mg_{1/3}Nb_{2/3})_{0.375}Ti_{0.375}Zr_{0.25}O_3$ | 0.5 | 0.1 | 1,260 | 1,712 | 53.6 | 1,089 | 0.49 |
| 19 | $Pb(Mg_{1/3}Nb_{2/3})_{0.375}Ti_{0.375}Zr_{0.25}O_3$ | | 0.2 | 1,260 | 75 | 57.7 | 1,762 | 1.93 |
| 20 | $Pb(Mg_{1/3}Nb_{2/3})_{0.375}Ti_{0.375}Zr_{0.25}O_3$ | 0.5 | 0.2 | 1,260 | 1,752 | 54.7 | 1,058 | 0.47 |
| 21 | $Pb(Mg_{1/3}Nb_{2/3})_{0.375}Ti_{0.375}Zr_{0.25}O_3$ | | 0.5 | 1,260 | 88 | 64.4 | 1,843 | 1.27 |
| 22 | $Pb(Mg_{1/3}Nb_{2/3})_{0.375}Ti_{0.375}Zr_{0.25}O_3$ | 0.5 | 0.5 | 1,260 | 2,051 | 55.3 | 932 | 0.35 |
| 23 | $Pb(Mg_{1/3}Nb_{2/3})_{0.375}Ti_{0.375}Zr_{0.25}O_3$ | 0.5 | 1.0 | 1,240 | 1,842 | 55.1 | 1,103 | 0.40 |
| 24 | $Pb(Mg_{1/3}Nb_{2/3})_{0.375}Ti_{0.375}Zr_{0.25}O_3$ | | 3.0 | 1,240 | 98 | 61.2 | 2,434 | 1.30 |
| 25 | $Pb(Mg_{1/3}Nb_{2/3})_{0.375}Ti_{0.375}Zr_{0.25}O_3$ | 0.5 | 3.0 | 1,240 | 1,780 | 54.6 | 1,410 | 0.45 |
| 26 | $Pb(Mg_{1/3}Nb_{2/3})_{0.375}Ti_{0.375}Zr_{0.25}O_3$ | | 5.0 | 1,240 | 103 | 58.3 | 2,654 | 1.22 |
| 27 | $Pb(Mg_{1/3}Nb_{2/3})_{0.375}Ti_{0.375}Zr_{0.25}O_3$ | 0.5 | 5.0 | 1,240 | 1,804 | 50.2 | 1,692 | 0.45 |
| 28 | $Pb(Mg_{1/3}Nb_{2/3})_{0.375}Ti_{0.375}Zr_{0.25}O_3$ | | 7.0 | 1,240 | 110 | 56.9 | 2,678 | 1.30 |
| 29 | $Pb(Mg_{1/3}Nb_{2/3})_{0.375}Ti_{0.375}Zr_{0.25}O_3$ | 0.5 | 7.0 | 1,240 | 1,477 | 50.2 | 1,743 | 0.47 |
| 30 | $Pb(Mg_{1/3}Nb_{2/3})_{0.4375}Ti_{0.4375}Zr_{0.125}O_3$ | None | None | 1,260 | 127 | 33.4 | 1,718 | 1.58 |
| 31 | $Pb(Mg_{1/3}Nb_{2/3})_{0.4375}Ti_{0.4375}Zr_{0.125}O_3$ | | 0.5 | 1,260 | 108 | 39.0 | 1,846 | 1.27 |
| 32 | $Pb(Mg_{1/3}Nb_{2/3})_{0.4375}Ti_{0.4375}Zr_{0.125}O_3$ | 0.5 | 0.5 | 1,260 | 1,476 | 41.2 | 1,734 | 0.35 |
| 33 | $Pb(Mg_{1/3}Nb_{2/3})_{0.4375}Ti_{0.4375}Zr_{0.125}O_3$ | 1.0 | 0.5 | 1,260 | 1,639 | 38.0 | 1,534 | 0.73 |
| 34 | $Pb(Mg_{1/3}Nb_{2/3})_{0.4375}Ti_{0.4375}Zr_{0.125}O_3$ | | 1.0 | 1,260 | 118 | 42.2 | 1,870 | 1.06 |
| 35 | $Pb(Mg_{1/3}Nb_{2/3})_{0.4375}Ti_{0.4375}Zr_{0.125}O_3$ | 0.5 | 1.0 | 1,260 | 1,742 | 39.4 | 1,616 | 0.27 |
| 36 | $Pb(Mg_{1/3}Nb_{2/3})_{0.125}Ti_{0.625}Zr_{0.25}O_3$ | None | None | 1,300 | 140 | 27.1 | 452 | 0.90 |
| 37 | $Pb(Mg_{1/3}Nb_{2/3})_{0.125}Ti_{0.625}Zr_{0.25}O_3$ | 0.5 | | 1,300 | 1,151 | 28.5 | 393 | 0.41 |
| 38 | $Pb(Mg_{1/3}Nb_{2/3})_{0.125}Ti_{0.625}Zr_{0.25}O_3$ | 0.5 | 0.5 | 1,300 | 1,324 | 38.9 | 425 | 0.53 |
| 39 | $Pb(Mg_{1/3}Nb_{2/3})_{0.125}Ti_{0.625}Zr_{0.25}O_3$ | 1.0 | | 1,300 | 1,227 | 26.8 | 341 | 0.82 |
| 40 | $Pb(Mg_{1/3}Nb_{2/3})_{0.125}Ti_{0.625}Zr_{0.25}O_3$ | 1.0 | 0.5 | 1,300 | 1,518 | 27.1 | 376 | 0.76 |

which properties are important to the use of piezoelectric compositions in filter applications. Example Nos. 1 to 29, Example Nos. 30 to 35 and Example Nos. 36 to 40 listed in table correspond to a composition defined by X, Y and Z in FIGURE 2, respectively. FIGURE 3 indicate the effect of amounts of $MnO_2$ addition on mechanical quality factor ($Q_M$) and planar coupling coefficient ($K_p$) of exemplary base compositions having 1.0 weight percent of NiO addition. From this figure it will be obvious that the compositions modified with combined NiO and $MnO_2$ additives exhibit a noticeable improvement of mechanical quality factor and planar coupling coefficient as compared with that of the composition with a single addition of $MnO_2$.

Figure 4:
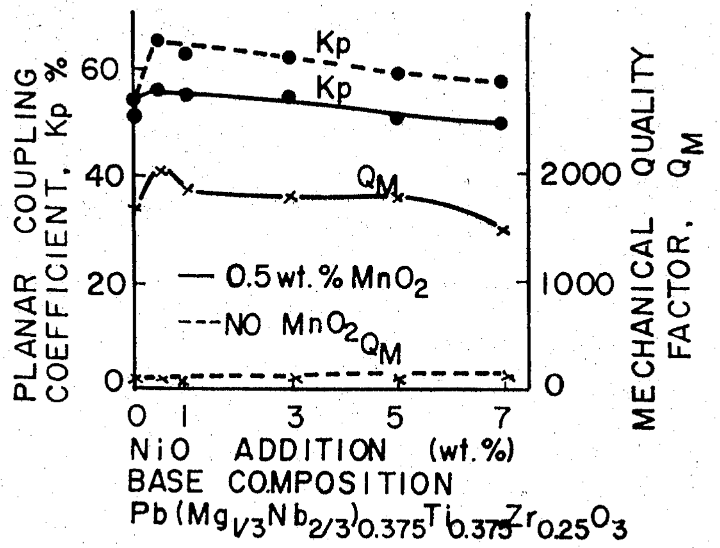

FIGURE 4 indicate the effect of amounts of NiO addition on mechanical quality factor ($Q_M$) and planar coupling coefficient ($K_p$) of exemplary base compositions having 0.5 weight percent of $MnO_2$ addition. From this figure it will be obvious that the compositions modified with combined $MnO_2$ and NiO additives exhibit a remarkable improvement of mechanical quality factor as compared with that of the composition with a single addition of NiO. Planar coupling coefficient of compositions modified with combined $MnO_2$ and NiO additives show a somewhat lowered value, but, these values are still higher than that of basic composition without additive. Improvements of mechanical quality factor for another base composition are also seen for the Example Nos. 32, 33, 35, 38 and 40 in table. From the foregoing table and figures, the values of mechanical quality factor, planar coupling coefficient and dielectric constant can be adjusted to suit various applications by selecting the base composition and amounts of combined additives.

In addition to the superior properties showed above, composition according to the present invention yield ceramics of good physical quality and which polarize well. It will be understood from the foregoing that the ternary solid solution $Pb(Mg_{1/3}Nb_{2/3})O_3$-$PbTiO_3$-$PbZrO_3$ modified with combined $MnO_2$ and NiO additives form a excellent piezoelectric ceramic body.

What is claimed is:

1. A piezoelectric ceramic composition consisting essentially of a base material expressed by the general formula $Pb(Mg_{1/3}Nb_{2/3})_xTi_yZr_zO_3$, where $x+y+z=1$, and having a composition within a polygonal region ABCDEF in the triangular composition diagram of FIGURE 2 and 0.1 to 6 weight percents of additive combination of nickel oxide and manganese oxide, said ceramic composition having 0.2 to 10 weight ratio of nickel oxide to manganese oxide, the molar ratio of the three components of each vertices are as follows:

| | $x$ | $y$ | $z$ |
|---|---|---|---|
| A | 0.875 | 0.125 | 0 |
| B | 0.875 | 0 | 0.125 |
| C | 0.050 | 0 | 0.950 |
| D | 0.010 | 0.040 | 0.950 |
| E | 0.010 | 0.813 | 0.177 |
| F | 0.187 | 0 813 | 0 |

2. A piezoelectric ceramic composition consisting essentially of a base material selected from those defined by and included within the polygonal area GHIKLNO of the triangular composition diagram in FIGURE 2 and 0.1 to 6 weight percents of additive combination of nickel oxide and manganese oxide, said ceramic composition having 0.2 to 10 weight ratio of nickel oxide to manganese oxide, the molar ratio of the three components of each vertices are as follows:

| | $x$ | $y$ | $z$ |
|---|---|---|---|
| G | 0.625 | 0.375 | 0 |
| H | 0.625 | 0.125 | 0.250 |
| I | 0.500 | 0.125 | 0.375 |
| K | 0.010 | 0.240 | 0.750 |
| L | 0.010 | 0.615 | 0.375 |
| N | 0.250 | 0.625 | 0.125 |
| O | 0.500 | 0.500 | 0 |

3. A piezoelectric ceramic composition consisting essentially of a base material selected from those defined by and included within the polygonal area PQRSTU of the triangular composition diagram in FIGURE 2 and 0.1 to 6 weight percents of additive combination of nickel oxide and manganese oxide, said ceramic composition having 0.2 to 10 weight ratio of nickel oxide to manganese oxide the molar ratio of the three components of each vertices are as follows:

| | x | y | z |
|---|---|---|---|
| P | 0.500 | 0.375 | 0.125 |
| Q | 0.500 | 0.250 | 0.250 |
| R | 0.125 | 0.250 | 0.625 |
| S | 0.0625 | 0.3125 | 0.625 |
| T | 0.0625 | 0.500 | 0.4375 |
| U | 0.375 | 0.500 | 0.125 |

4. A piezoelectric transducer element comprising an electrostatically polarized solid solution ceramic consisting essentially of a material selected from the polygonal area PQRSTU of FIGURE 2 and 1.5 weight percents of additive combination of nickel oxide and manganese oxide, said ceramic composition having 0.5 to 2.0 of a weight ratio of nickel oxide to manganese oxide.

5. A piezoelectric ceramic composition consisting essentially of 99 weight percent $Pb(Mg_{1/3}Nb_{2/3})_{0.375}$ $Ti_{3.375}$ $Zr_{0.25}O_3$, 0.5 weight percent nickel oxide (NiO) and 0.5 weight percent manganese oxide ($MnO_2$).

6. A piezoelectric ceramic composition consisting essentially of 99 weight percent $Pb(Mg_{1/3}Nb_{2/3})_{0.4375}$ $Ti_{0.4375}Zr_{0.125}O_3$, 0.5 weight percent nickel oxide (NiO) and 0.5 weight percent manganese oxide ($MnO_2$).

References Cited

UNITED STATES PATENTS 3,068,177 12/1962 Sugden ............ 252—62.9

3,268,453 8/1966 Ouchi et al. ........ 252—62.9

TOBIAS E. LEVOW, *Primary Examiner.*

ROBERT D. EDMONDS, *Assistant Examiner.*

U.S. Cl. X.R.

106—39